United States Patent
Hokai et al.

(10) Patent No.: US 11,275,378 B2
(45) Date of Patent: Mar. 15, 2022

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Keisuke Hokai, Susono (JP); Kazuhiko Kamikado, Susono (JP); Taichi Kawanai, Susono (JP); Masahiro Harada, Hadano (JP); Nobuhide Kamata, Susono (JP); Yasuhiro Takagi, Toyota (JP); Hideo Fukamachi, Hadano (JP); Eiji Sakaguchi, Shizuoka-ken (JP); Hideyuki Matsui, Shizuoka-ken (JP); Yusuke Hayashi, Susono (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 241 days.

(21) Appl. No.: 16/517,811

(22) Filed: Jul. 22, 2019

(65) Prior Publication Data
US 2020/0133277 A1 Apr. 30, 2020

(30) Foreign Application Priority Data
Oct. 24, 2018 (JP) .............................. JP2018-200207

(51) Int. Cl.
*G05D 1/02* (2020.01)
*G05D 1/00* (2006.01)
(Continued)

(52) U.S. Cl.
CPC ........... *G05D 1/0212* (2013.01); *B60W 50/14* (2013.01); *G05D 1/0088* (2013.01); *B60R 1/00* (2013.01);
(Continued)

(58) Field of Classification Search
CPC ............... G05D 1/0212; G05D 1/0088; G05D 2201/0213; B60W 50/14; B60W 2050/009; B60W 2050/146; B60R 1/00
(Continued)

(56) References Cited

U.S. PATENT DOCUMENTS

2017/0135621 A1\* 5/2017 Lee .......................... A61B 3/10
2017/0308083 A1\* 10/2017 Sato ....................... B60Q 5/005
(Continued)

FOREIGN PATENT DOCUMENTS

JP 2002-162243 A 6/2002
JP 2003-162799 A 6/2003
(Continued)

OTHER PUBLICATIONS

U.S. Appl. No. 16/660,274, filed Oct. 22, 2019.

*Primary Examiner* — Yazan A Soofi
(74) *Attorney, Agent, or Firm* — Sughrue Mion, PLLC

(57) ABSTRACT

A vehicle control system includes a vehicle control apparatus configured to set a target trajectory of a vehicle in autonomous driving, a manual driving database configured to contain manual driving trajectory information that indicates a manual driving trajectory that is a trajectory of the vehicle in manual driving, a weight acquisition device configured to acquire weight information that indicates weights of the target trajectory and manual driving trajectory, the weights being designated by a user of the vehicle, and a trajectory adjusting device configured to determine an integrated target trajectory by integrating the target trajectory and the manual driving trajectory based on the weights indicated by the weight information. The vehicle control apparatus is configured to control the autonomous driving of the vehicle such that the vehicle follows the integrated target trajectory.

9 Claims, 14 Drawing Sheets

(51) Int. Cl.
    *B60W 50/14*     (2020.01)
    *B60W 50/00*     (2006.01)
    *B60R 1/00*     (2006.01)

(52) U.S. Cl.
    CPC .... *B60R 2300/30* (2013.01); *B60W 2050/009* (2013.01); *B60W 2050/146* (2013.01); *G05D 2201/0213* (2013.01)

(58) Field of Classification Search
    USPC .......................................................... 701/25
    See application file for complete search history.

(56) References Cited

U.S. PATENT DOCUMENTS

| | | | |
|---|---|---|---|
| 2018/0143639 A1* | 5/2018 | Singhal | G01S 7/497 |
| 2019/0009794 A1* | 1/2019 | Toyoda | B60W 50/085 |
| 2019/0039618 A1* | 2/2019 | Mori | B60W 10/20 |
| 2019/0072974 A1* | 3/2019 | Hwang | G06K 9/00818 |
| 2019/0086231 A1* | 3/2019 | Arakawa | G05D 1/0088 |

FOREIGN PATENT DOCUMENTS

| | | | |
|---|---|---|---|
| JP | 2005-99930 A | 4/2005 |
| JP | 2007-278082 A | 10/2007 |
| JP | 2010-3174 A | 1/2010 |
| JP | 2018-022353 A | 2/2018 |

* cited by examiner

FIG. 4
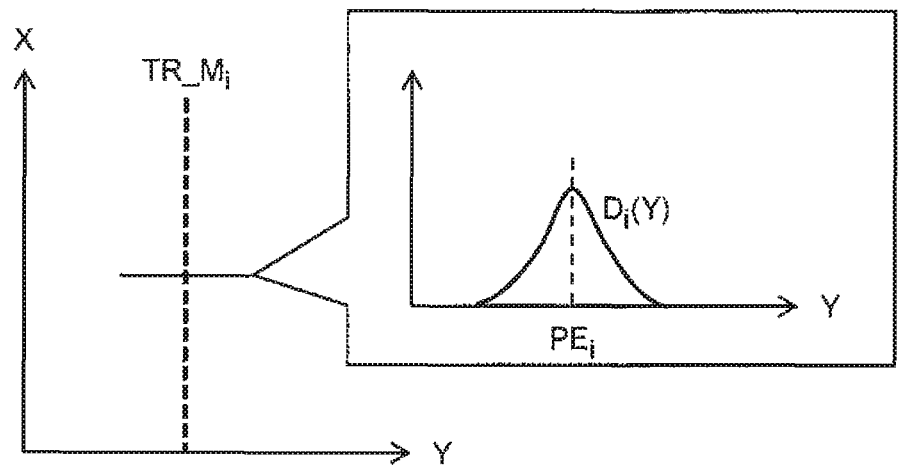
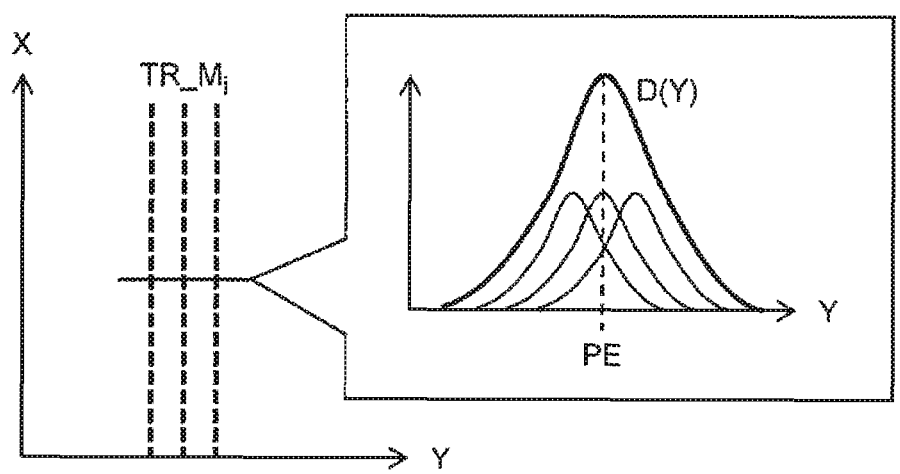
FIG. 5
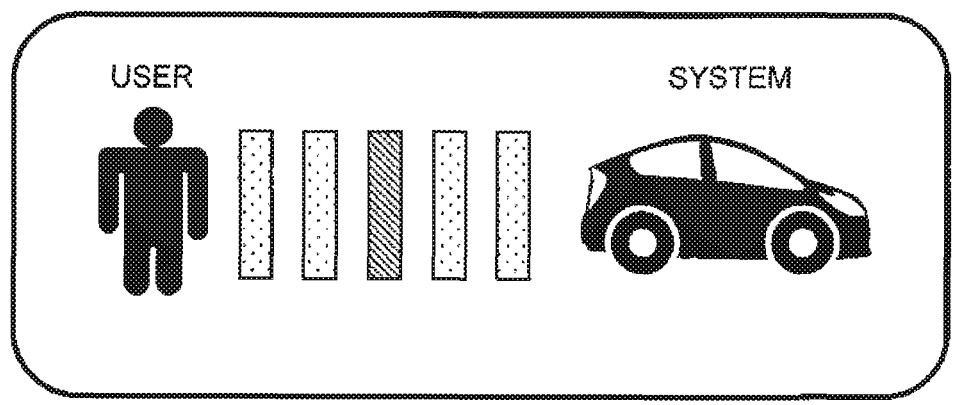

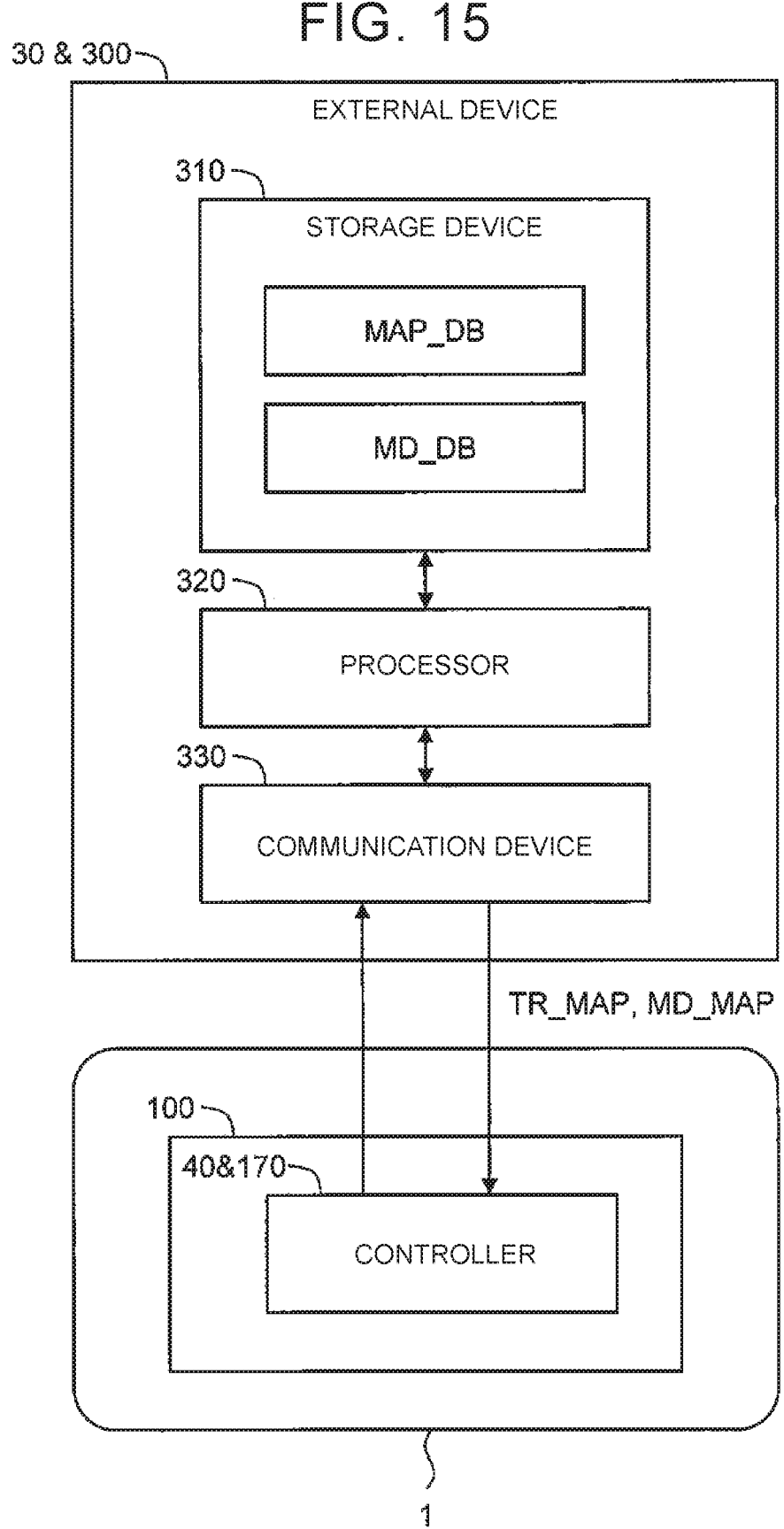

VEHICLE CONTROL SYSTEM AND VEHICLE CONTROL METHOD

INCORPORATION BY REFERENCE

The disclosure of Japanese Patent Application No. 2018-200207 filed on Oct. 24, 2018 including the specification, drawings and abstract is incorporated herein by reference in its entirety.

BACKGROUND

1. Technical Field

The disclosure relates to a vehicle control system and vehicle control method that control autonomous driving of a vehicle.

2. Description of Related Art

Japanese Unexamined Patent Application Publication No. 2018-022353 (JP 2018-022353 A) describes a vehicle travel control system that causes a vehicle to autonomously travel along a target trajectory. The vehicle travel control system acquires a trajectory of travel of the vehicle based on information about the position of the vehicle in manual driving. Then, the vehicle travel control system sets the trajectory of travel in manual driving for a target trajectory of the vehicle in autonomous driving.

Japanese Unexamined Patent Application Publication No. 2003-162799 (JP 2003-162799 A) describes a travel control method for a vehicle. With the travel control method, an actual travel line in a driving lane is recorded. Then, a target travel line in the driving lane under autonomous steering control is set based on the recorded travel line.

SUMMARY

With the technique described in JP 2018-022353 A, a trajectory of travel in manual driving is set for a target trajectory of the vehicle in autonomous driving. However, every user (typically, a driver) does not always like a trajectory of travel in manual driving as a target trajectory in autonomous driving. For example, there may be a driver who lacks confidence in manual driving. It is undesirable from the viewpoint of convenience that a trajectory of travel in manual driving be uniformly set for a target trajectory in autonomous driving.

The disclosure provides a technique for making it possible to flexibly set a trajectory of a vehicle in autonomous driving according to user's preference.

A first aspect of the disclosure relates to a vehicle control system. The vehicle control system includes a vehicle control apparatus configured to set a target trajectory of a vehicle in autonomous driving, a manual driving database configured to contain manual driving trajectory information that indicates a manual driving trajectory that is a trajectory of the vehicle in manual driving, a weight acquisition device configured to acquire weight information that indicates weights of the target trajectory and manual driving trajectory, the weights being designated by a user of the vehicle, and a trajectory adjusting device configured to determine an integrated target trajectory by integrating the target trajectory and the manual driving trajectory based on the weights indicated by the weight information. The vehicle control apparatus is configured to control the autonomous driving of the vehicle such that the vehicle follows the integrated target trajectory.

According to the above aspect of the disclosure, the vehicle control apparatus sets the target trajectory of the vehicle in autonomous driving. The weight acquisition device acquires the weight information that indicates the weights of the target trajectory and manual driving trajectory, the weights being designated by the user of the vehicle. The trajectory adjusting device determines the integrated target trajectory by integrating the target trajectory and the manual driving trajectory based on the weights designated by the user. The vehicle control apparatus controls the autonomous driving of the vehicle such that the vehicle follows the integrated target trajectory. As a result, the trajectory of the vehicle in autonomous driving reflects the weights designated by the user, that is, user's preference. In other words, the user is allowed to flexibly set the trajectory of the vehicle in autonomous driving by designating the weights. Thus, convenience of autonomous driving improves.

A second aspect of the disclosure relates to a vehicle control method. The vehicle control method includes setting a target trajectory of a vehicle in autonomous driving, storing manual driving trajectory information that indicates a manual driving trajectory that is a trajectory of the vehicle in manual driving, acquiring weight information that indicates weights of the target trajectory and manual driving trajectory, the weights being designated by a user of the vehicle, determining an integrated target trajectory by integrating the target trajectory and the manual driving trajectory based on the weights indicated by the weight information, and controlling the autonomous driving of the vehicle such that the vehicle follows the integrated target trajectory.

According to the above aspect of the disclosure, the vehicle control method sets the target trajectory of the vehicle in autonomous driving, acquires the weight information that indicates the weights of the target trajectory and manual driving trajectory, the weights being designated by the user of the vehicle, determines the integrated target trajectory by integrating the target trajectory and the manual driving trajectory based on the weights designated by the user, and controls the autonomous driving of the vehicle such that the vehicle follows the integrated target trajectory. As a result, the trajectory of the vehicle in autonomous driving reflects the weights designated by the user, that is, user's preference. In other words, the user is allowed to flexibly set the trajectory of the vehicle in autonomous driving by designating the weights. Thus, convenience of autonomous driving improves.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a conceptual view for illustrating an example of step S200 in FIG. 3;

FIG. 5 is a conceptual view for illustrating an example of step S300 in FIG. 3;

FIG. 15 is a block diagram that shows a third example of the configuration of the trajectory adjusting device according to the embodiment of the disclosure.

DETAILED DESCRIPTION OF EMBODIMENTS

An embodiment of the disclosure will be described with reference to the accompanying drawings.

1. Outline 1-1. Vehicle Control Apparatus

Figure 1:
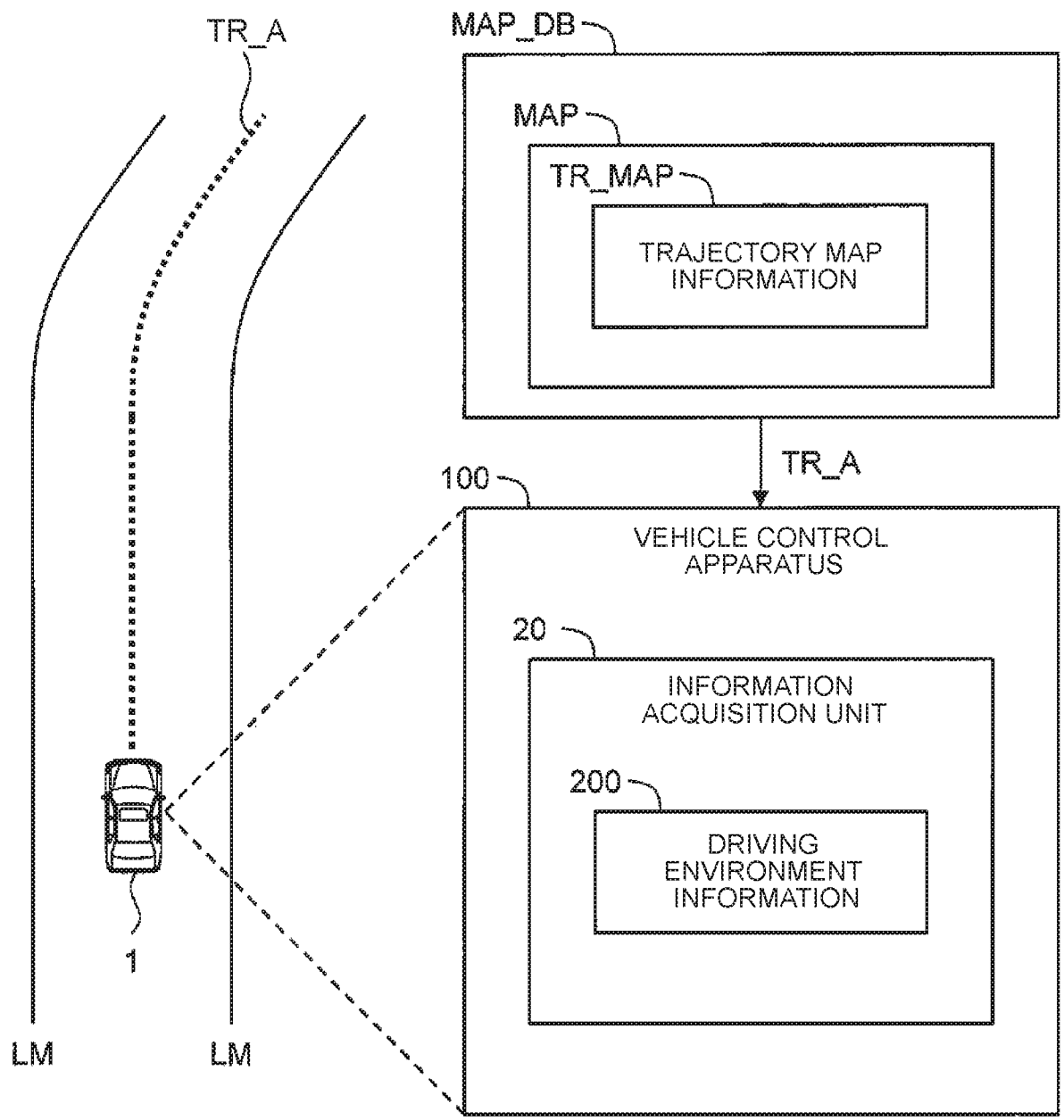
FIG. 1 is a conceptual view for illustrating a vehicle control apparatus according to an embodiment of the disclosure.

FIG. 1 is a conceptual view for illustrating a vehicle control apparatus 100 according to the embodiment. The vehicle control apparatus 100 is mounted on a vehicle 1, and controls the vehicle 1.

The vehicle control apparatus 100 includes an information acquisition unit 20. The information acquisition unit 20 acquires various pieces of information with the use of sensors mounted on the vehicle 1. Information that is acquired by the sensors mounted on the vehicle 1 is information that indicates a driving environment of the vehicle 1, and hereinafter referred to as driving environment information 200. For example, the driving environment information 200 contains vehicle positional information that indicates a position of the vehicle 1, vehicle status information that indicates a status of the vehicle 1, surrounding situation information that indicates a situation around the vehicle 1, and other information.

The vehicle control apparatus 100 controls the vehicle 1 based on the driving environment information 200. For example, the vehicle control apparatus 100 executes driving assist control based on the driving environment information 200. That is, the vehicle control apparatus 100 assists in driving the vehicle 1 based on the driving environment information 200. The driving assist control includes at least one of steering control, acceleration control, and deceleration control. In the present embodiment, autonomous driving control that is an example of the driving assist control will be specifically discussed.

In autonomous driving of the vehicle 1, map information MAP is often used. The map information MAP provides various pieces of information associated with positions. Positions are absolute positions and are defined in the absolute coordinate system (latitude, longitude, and altitude). The map information MAP is not limited to a general road map or navigation map. Pieces of map information MAP created from various viewpoints are conceivable. A map database MAP_DB is an aggregate of such pieces of map information MAP. The map database MAP_DB may be stored in a storage device of the vehicle 1 or may be stored in an external device outside the vehicle 1.

In the present embodiment, the map information MAP contains trajectory map information TR_MAP that indicates a target trajectory TR_A of the vehicle 1. The target trajectory TR_A is a trajectory along which the vehicle 1 should travel in a situation where there is no obstacle in autonomous driving. The target trajectory TR_A is a local trajectory different from a global target route to a destination. The target trajectory TR_A is set in accordance with a set rule. For example, the target trajectory TR_A is set so as to run along the center of a lane.

The vehicle control apparatus 100 sets a target trajectory TR_A in a target travel range. The target travel range is, for example, a range along a target route to a destination. The vehicle control apparatus 100 sets a target trajectory TR_A by reading the trajectory map information TR_MAP on the target travel range from the map database MAP_DB. Alternatively, the vehicle control apparatus 100 may set a target trajectory TR_A based on the driving environment information 200 while the vehicle 1 is traveling in the target travel range. For example, the vehicle control apparatus 100 recognizes white lines LM that define a lane based on the driving environment information 200 (surrounding situation information). The vehicle control apparatus 100 calculates a lane center position from the positions of the white lines LM, and sets the lane center position as the target trajectory TR_A.

Typically, the vehicle control apparatus 100 controls autonomous driving of the vehicle 1 such that the vehicle 1 follows the target trajectory TR_A. However, in this case, the trajectory of the vehicle 1 does not reflect a preference of a user (typically, a driver) of the vehicle 1. For example, a driver who is confident of a travel trajectory in manual driving is likely to prefer that the vehicle 1 travels along a trajectory, similar to the trajectory in manual driving, also in autonomous driving. On the other hand, a driver who is not confident of a travel trajectory in manual driving is likely to prefer the target trajectory TR_A that the vehicle control apparatus 100 sets. A user who puts a great trust in the vehicle control apparatus 100 is highly likely to prefer the target trajectory TR_A that the vehicle control apparatus 100 sets.

From the above viewpoint, the present embodiment suggests a technique for making it possible to flexibly set a trajectory of the vehicle 1 in autonomous driving according to user's preference.

1-2. Vehicle Control System

Figure 2:
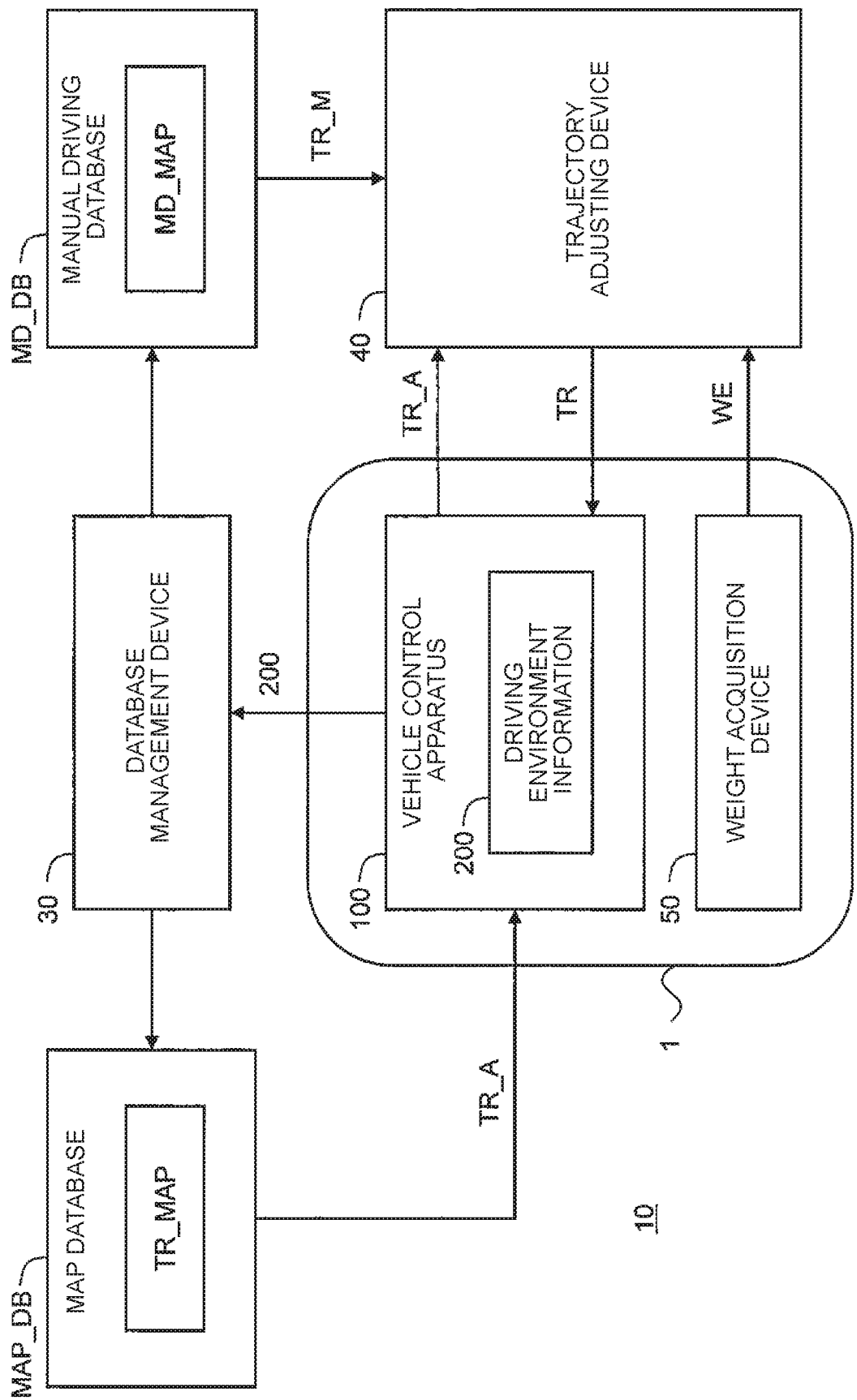
FIG. 2 is a block diagram that schematically shows an example of the configuration of a vehicle control system according to the embodiment of the disclosure.

FIG. 2 is a block diagram that schematically shows an example of the configuration of a vehicle control system 10 according to the present embodiment. The vehicle control system 10 controls the vehicle 1. In the example shown in FIG. 2, the vehicle control system 10 includes a manual driving database MD_DB, a database management device 30, a trajectory adjusting device 40, and a weight acquisition device 50 in addition to the vehicle control apparatus 100 and the map database MAP_DB.

The manual driving database MD_DB contains manual driving trajectory information MD_MAP. The manual driving trajectory information MD_MAP indicates a manual driving trajectory TR_M that is a trajectory of the vehicle 1 in manual driving. As in the case of the target trajectory TR_A, the manual driving trajectory TR_M is defined in the absolute coordinate system. The manual driving trajectory information MD_MAP may be regarded as a type of map information MAP. The manual driving database MD_DB may be stored in the storage device of the vehicle 1 or may be stored in an external device outside the vehicle 1.

The database management device 30 manages the manual driving database MD_DB and the map database MAP_DB. The details of the database management device 30 will be described in Section 3 later.

The weight acquisition device 50 is mounted on the vehicle 1. The weight acquisition device 50 receives user's preference on the travel trajectory of the vehicle 1. More specifically, the weight acquisition device 50 acquires weight information WE that indicates the weights of the target trajectory TR_A and manual driving trajectory TR_M, which are designated by the user of the vehicle 1. Weights may be regarded as the priorities of the target trajectory TR_A and manual driving trajectory TR_M. The weights can be 100 to 0.

The trajectory adjusting device 40 adjusts the trajectory of the vehicle 1 in autonomous driving according to the weights designated by the user. More specifically, the trajectory adjusting device 40 acquires the information that indicates the target trajectory TR_A set by the vehicle control apparatus 100. The trajectory adjusting device 40 acquires the manual driving trajectory information MD_MAP on the target travel range from the manual driving database MD_DB. In addition, the trajectory adjusting device 40 acquires the weight information WE from the weight acquisition device 50. The trajectory adjusting device 40 executes a trajectory adjusting process based on the acquired information. Specifically, the trajectory adjusting device 40 determines an integrated target trajectory TR by integrating the target trajectory TR_A and the manual driving trajectory TR_M based on the weights indicated by the weight information WE. The trajectory adjusting device 40 provides the determined integrated target trajectory TR to the vehicle control apparatus 100.

The trajectory adjusting device 40 may be mounted on the vehicle 1 or may be included in an external device outside the vehicle 1. Alternatively, the trajectory adjusting device 40 may be disposed in the vehicle 1 and in the external device in a distributed manner.

The vehicle control apparatus 100 controls the autonomous driving of the vehicle 1 based on the integrated target trajectory TR instead of the target trajectory TR_A. That is, the vehicle control apparatus 100 controls the autonomous driving of the vehicle 1 such that the vehicle 1 follows the integrated target trajectory TR. As a result, the trajectory of the vehicle 1 in autonomous driving reflects the weights designated by the user, that is, the user's preference.

1-3. Flow of Process

Figure 3:
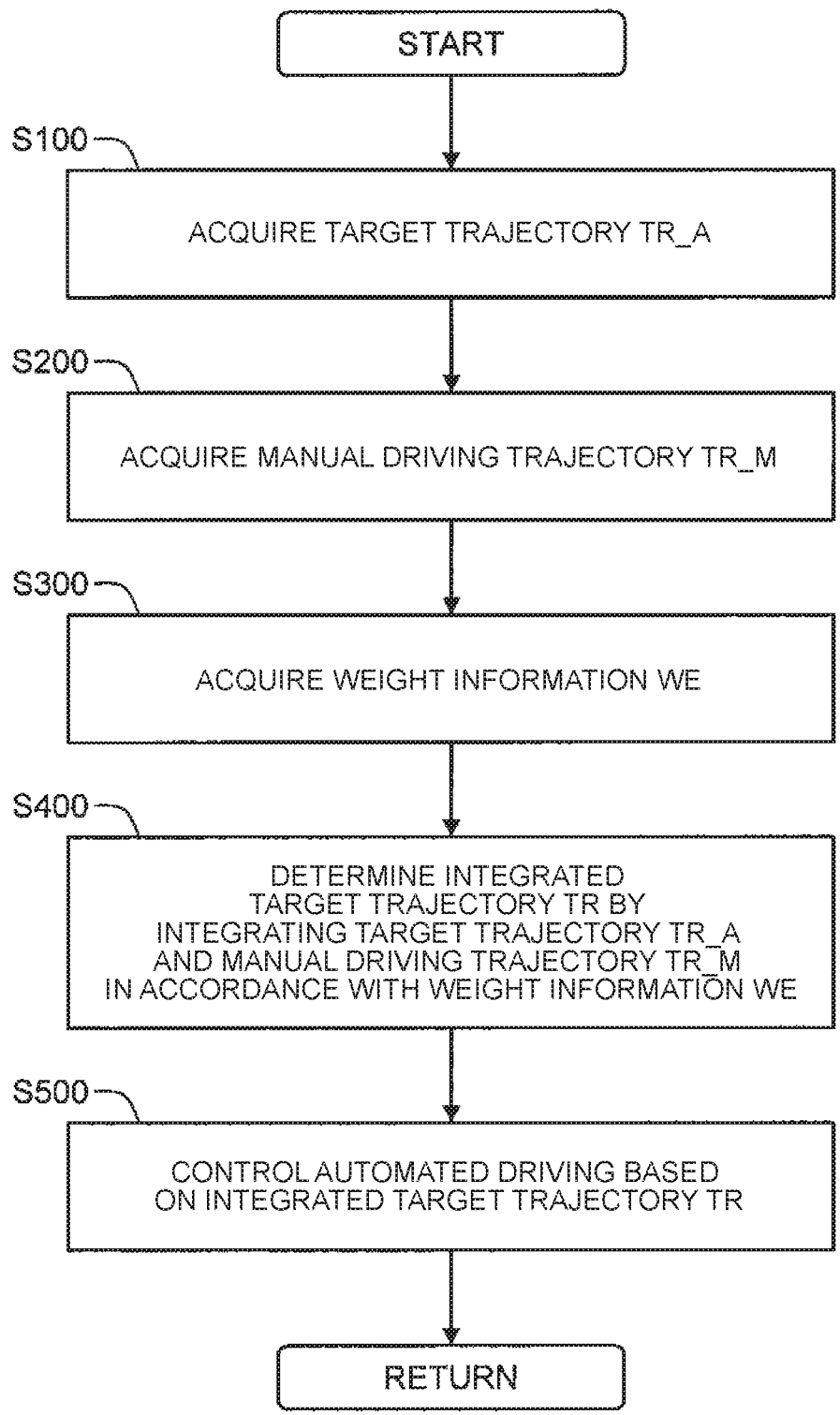
FIG. 3 is a flowchart that schematically shows a process that is executed by the vehicle control system according to the embodiment of the disclosure.

FIG. 3 is a flowchart that schematically shows a process that is executed by the vehicle control system 10 according to the embodiment.

1-3-1. Step S100

The vehicle control apparatus 100 sets a target trajectory TR_A in a target travel range. Specifically, the vehicle control apparatus 100 sets a target trajectory TR_A by reading the trajectory map information TR_MAP on the target travel range from the map database MAP_DB. Alternatively, the vehicle control apparatus 100 may set a target trajectory TR_A based on the driving environment information 200 while the vehicle 1 is traveling in the target travel range. The trajectory adjusting device 40 acquires the information that indicates the target trajectory TR_A set by the vehicle control apparatus 100.

1-3-2. Step S200

The trajectory adjusting device 40 acquires the manual driving trajectory information MD_MAP that indicates the manual driving trajectory TR_M in the target travel range from the manual driving database MD_DB.

There can be a plurality of manual driving trajectories TR_M in a target travel range. In this case, the trajectory adjusting device 40 acquires a representative manual driving trajectory TR_M' by integrating the manual driving trajectories TR_M. The representative manual driving trajectory TR_M' is treated as the one equivalent to the manual driving trajectory TR_M.

FIG. 4 is a conceptual view for illustrating an example of a method of acquiring a representative manual driving trajectory TR_M'. The X direction represents a direction along a lane in which the vehicle 1 travels. The Y direction is a direction perpendicular to the X direction. In the same section of the lane, there is a plurality of manual driving trajectories TR_$M_i$ (i is an integer greater than or equal to two). For each of the manual driving trajectories TR_$M_i$, a distribution $D_i(Y)$ is defined for each position X. A peak position $PE_i$ of the distribution $D_i(Y)$ is the Y position of the manual driving trajectory TR_$M_i$. For example, the distribution $D_i(Y)$ is a Gaussian distribution with the Y position of the manual driving trajectory TR_$M_i$ as a mean. An integrated distribution D(Y) is obtained by combining respective distributions $D_i(Y)$ on the manual driving trajectories TR_$M_i$. A line connecting the peak positions $PE_i$ of the integrated distributions D(Y) is used as the representative manual driving trajectory TR_M'.

1-3-3. Step S300

The user of the vehicle 1 designates the weights of the target trajectory TR_A and manual driving trajectory TR_M. The weight acquisition device 50 acquires the weight information WE that indicates the weights designated by the user. The trajectory adjusting device 40 acquires the weight information WE from the weight acquisition device 50.

For example, the weight acquisition device 50 includes a human machine interface (HMI) unit. The weight acquisition device 50 prompts the user to designate weights through the HMI unit. The user designates weights by using the HMI unit.

For example, the HMI unit displays a weight designation page as shown in FIG. 5 on a touch panel. The weight designation page contains a plurality of buttons for designating different weights. The user selects a desired one from among the buttons displayed on the touch panel. When the user selects a button closer to "USER", the weight of the manual driving trajectory TR_M increases. On the other hand, when the user selects a button closer to "SYSTEM", the weight of the target trajectory TR_A increases.

Figure 6:
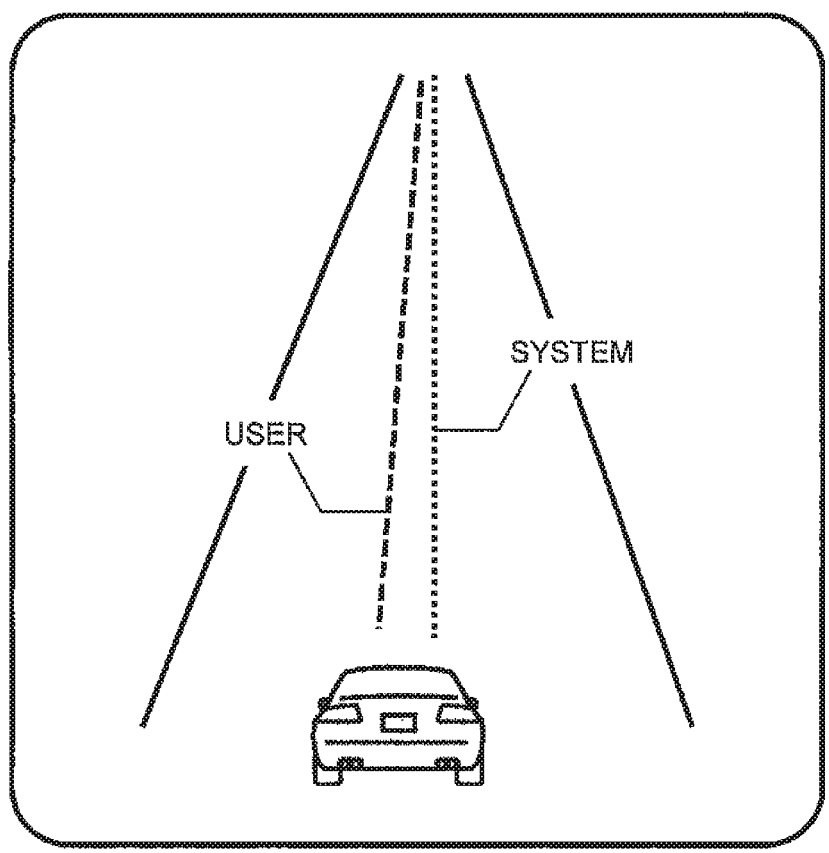
FIG. 6 is a conceptual view for illustrating another example of step S300 in FIG. 3.

As shown in FIG. 6, the HMI unit may visually display the target trajectory TR_A (SYSTEM) and the manual driving trajectory TR_M (USER). When an image forward of the vehicle 1 is available, the HMI unit may display the target trajectory TR_A and the manual driving trajectory TR_M over the forward image. The user is allowed to designate weights while checking the positional relationship between the target trajectory TR_A and the manual driving trajectory TR_M. Thus, convenience further improves.

1-3-4. Step S400

Figure 7:
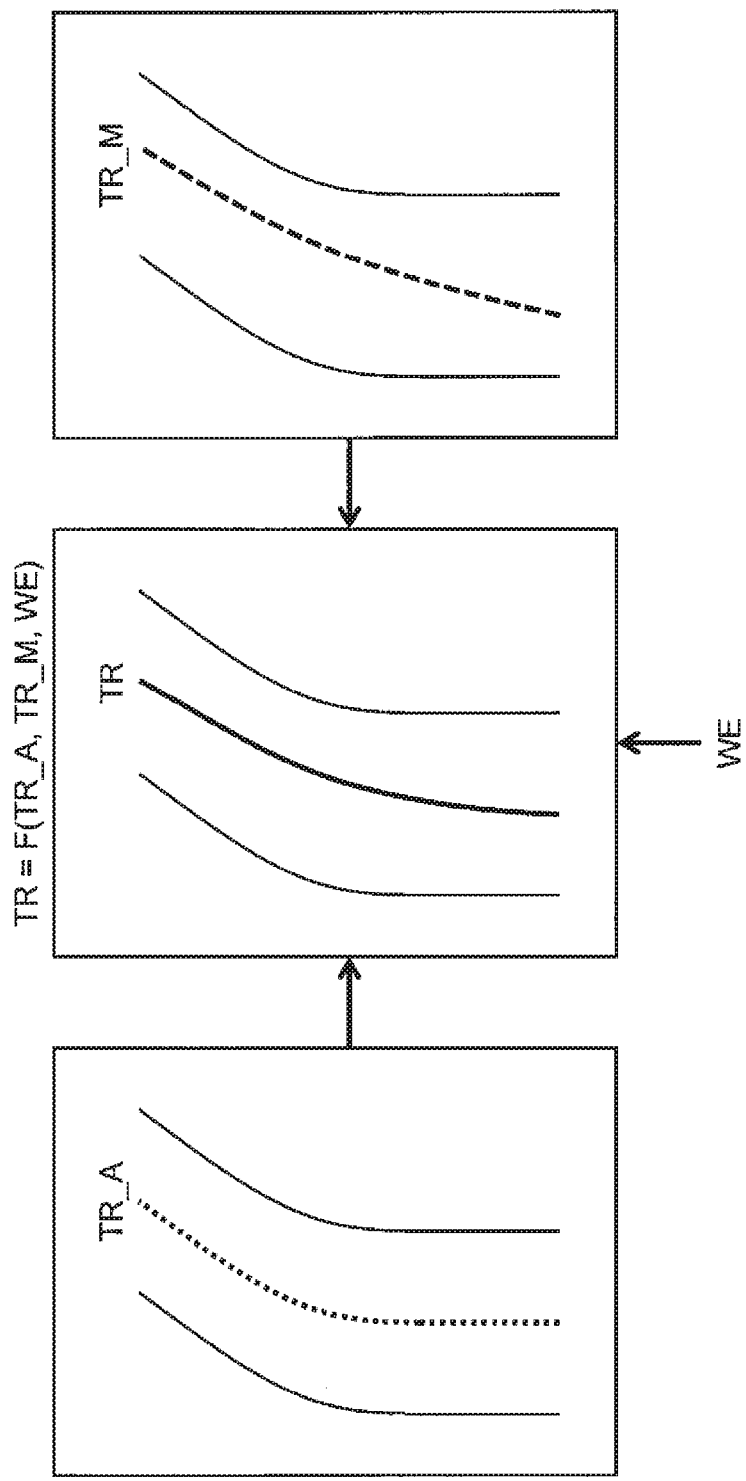
FIG. 7 is a conceptual view for illustrating a trajectory adjusting process that is executed by a trajectory adjusting device according to the embodiment of the disclosure.

The trajectory adjusting device 40 executes a trajectory adjusting process based on the information acquired in step S100 to step S300. FIG. 7 is a conceptual view for illustrating the trajectory adjusting process. The trajectory adjusting device 40 determines an integrated target trajectory TR by integrating the target trajectory TR_A and the manual driving trajectory TR_M based on the weights designated in the weight information WE. When the representative manual driving trajectory TR_M' has been acquired in step S200, the representative manual driving trajectory TR_M' is used as the manual driving trajectory TR_M. The weights can be 100 to 0. That is, the target trajectory TR_A or the manual driving trajectory TR_M (representative manual driving trajectory TR_M') can be directly determined as the integrated target trajectory TR.

1-3-5. Step S500

The trajectory adjusting device 40 provides the determined integrated target trajectory TR to the vehicle control apparatus 100. The vehicle control apparatus 100 controls the autonomous driving of the vehicle 1 based on the integrated target trajectory TR instead of the target trajectory TR_A. That is, the vehicle control apparatus 100 controls the autonomous driving of the vehicle 1 such that the vehicle 1 follows the integrated target trajectory TR.

1-4. Advantageous Effects

As described above, according to the present embodiment, the vehicle control apparatus 100 sets the target trajectory TR_A of the vehicle 1 in autonomous driving. The weight acquisition device 50 acquires the weight information WE that indicates the weights of the target trajectory TR_A and manual driving trajectory TR_M, which are designated by the user of the vehicle 1. The trajectory adjusting device 40 determines an integrated target trajectory TR by integrating the target trajectory TR_A and the manual driving trajectory TR_M based on the weights designated by the user. The vehicle control apparatus 100 controls the autonomous driving of the vehicle 1 such that the vehicle 1 follows the integrated target trajectory TR. As a result, the trajectory of the vehicle 1 in autonomous driving reflects the weights designated by the user, that is, the user's preference. In other words, the user is allowed to flexibly set the trajectory of the vehicle 1 in autonomous driving by designating the weights. Thus, convenience of autonomous driving improves.

Hereinafter, the vehicle control system 10 according to the present embodiment will be more specifically described.

2. Specific Example of Vehicle Control Apparatus 2-1. Components

Figure 8:
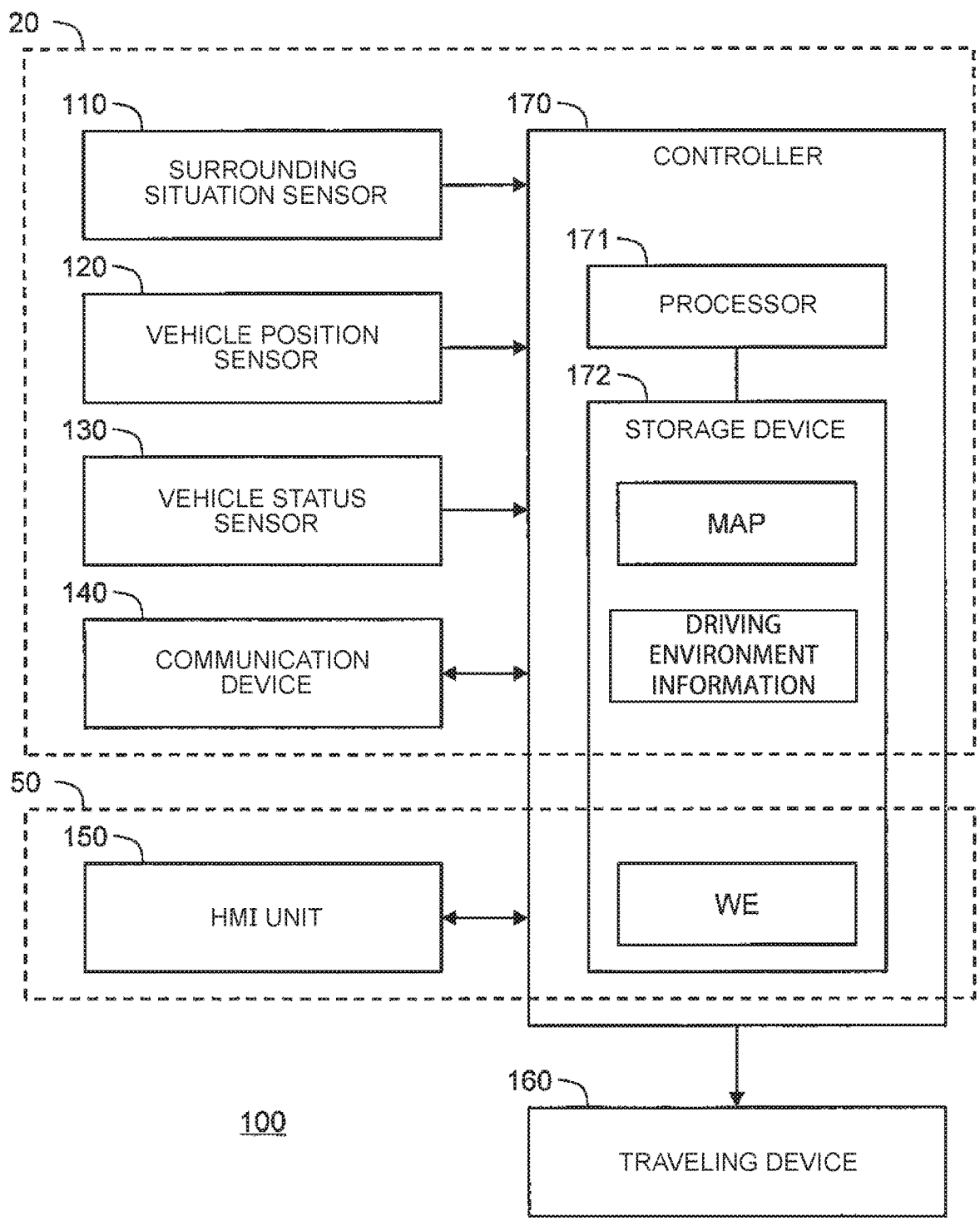
FIG. 8 is a block diagram that shows an example of the configuration of the vehicle control apparatus according to the embodiment of the disclosure.

FIG. 8 is a block diagram that shows an example of the configuration of the vehicle control apparatus 100 according to the present embodiment. The vehicle control apparatus 100 is mounted on the vehicle 1. The vehicle control apparatus 100 includes a surrounding situation sensor 110, a vehicle position sensor 120, a vehicle status sensor 130, a communication device 140, an HMI unit 150, a traveling device 160, and a controller 170.

The surrounding situation sensor 110 detects a situation around the vehicle 1. Examples of the surrounding situation sensor 110 include a camera (imaging device), laser imaging detection and ranging (lidar), and radar. The camera captures the image of a situation around the vehicle 1. The lidar detects a target around the vehicle 1 by using laser beam. The radar detects a target around the vehicle 1 by using radio waves.

The vehicle position sensor 120 detects the position and direction of the vehicle 1. Examples of the vehicle position sensor 120 include a global positioning system (GPS) sensor. The GPS sensor receives signals that are transmitted from a plurality of GPS satellites, and calculates the position and direction of the vehicle 1 based on the received signals.

The vehicle status sensor 130 detects the status of the vehicle 1. The status of the vehicle 1 includes the speed (vehicle speed), acceleration, steering angle, yaw rate, and the like, of the vehicle 1. The status of the vehicle 1 also includes a driving operation made by a driver of the vehicle 1. The driving operation includes accelerator operation, brake operation, and steering operation.

The communication device 140 communicates with a device outside the vehicle 1. For example, the communication device 140 communicates with an external device outside the vehicle 1 via a communication network. The communication device 140 may carry out vehicle-to-infrastructure (V2I) communication with a surrounding infrastructure. The communication device 140 may carry out vehicle-to-vehicle (V2V) communication with a surrounding vehicle.

The HMI unit 150 is an interface for providing information to the user of the vehicle 1 and receiving information from the user. Specifically, the HMI unit 150 has an input device and an output device. Examples of the input device include a touch panel, a switch, and a microphone. Examples of the output device include a display device and a speaker.

The traveling device 160 includes a steering device, a drive device, and a braking device. The steering device directs wheels. The drive device is a power source that generates driving force. Examples of the drive device include an electric motor and an engine. The braking device generates braking force.

The controller 170 is a microcomputer including a processor 171 and a storage device 172. The controller 170 is also called an electronic control unit (ECU). When the processor 171 executes control programs stored in the storage device 172, various processes are implemented by the controller 170.

2-2. Acquisition of Driving Environment Information

The controller 170 acquires the driving environment information 200. The driving environment information 200 is stored in the storage device 172, read, and used as needed.

Figure 9:
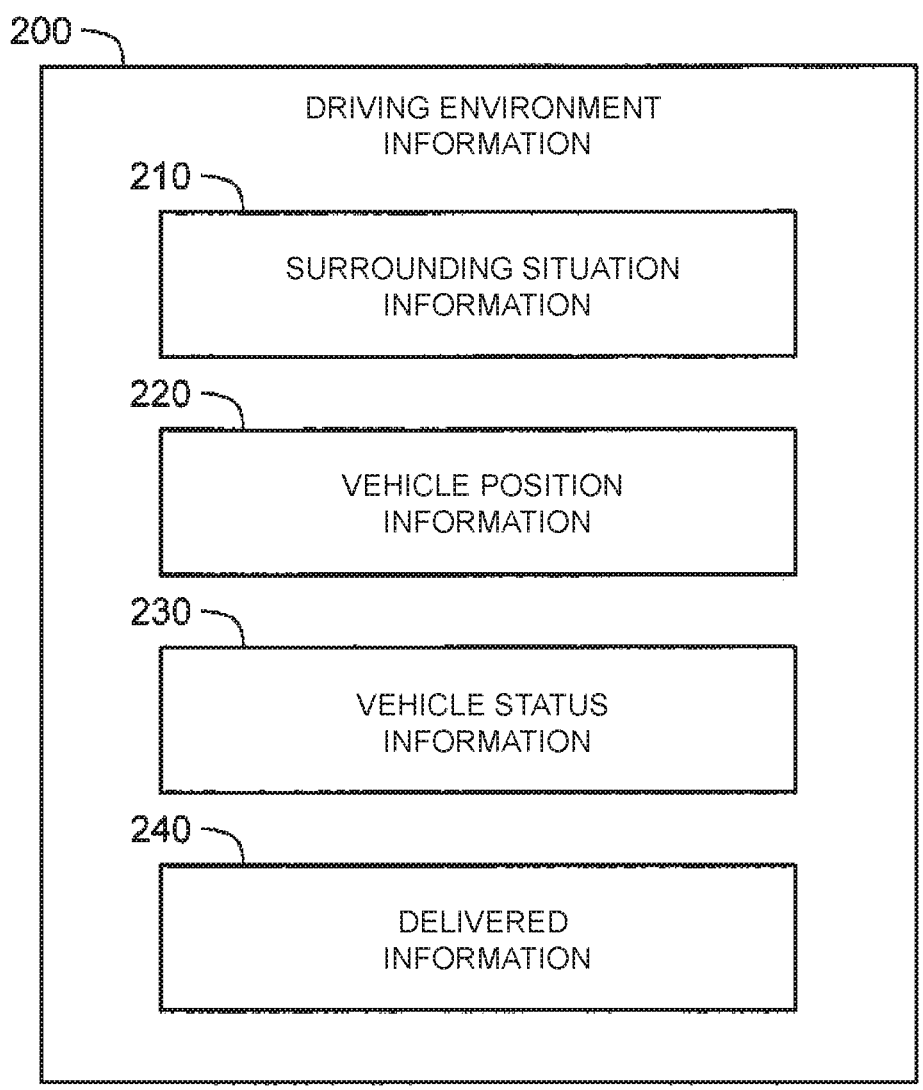
FIG. 9 is a block diagram that shows an example of driving environment information that is used in the embodiment of the disclosure.

FIG. 9 shows an example of the driving environment information 200. The driving environment information 200 contains surrounding situation information 210, vehicle positional information 220, vehicle status information 230, and delivered information 240.

The surrounding situation information 210 indicates a situation around the vehicle 1. The surrounding situation information 210 is information that is obtained from a result detected by the surrounding situation sensor 110. For example, the surrounding situation information 210 contains captured image information obtained with the camera. The surrounding situation information 210 also contains measured information measured with the lidar or the radar. The surrounding situation information 210 may contain target information about a target that is detected based on captured image information and measured information. Examples of the target around the vehicle 1 include a surrounding vehicle, a pedestrian, a white line, a roadside object, and a sign. The target information contains the relative position, relative velocity, and the like, of a detected target with respect to the vehicle 1. The controller 170 acquires the surrounding situation information 210 based on a result detected by the surrounding situation sensor 110.

The vehicle positional information 220 indicates the position and direction of the vehicle 1. The controller 170 acquires the vehicle positional information 220 from the vehicle position sensor 120. The controller 170 may increase the accuracy of the vehicle positional information 220 by performing known localization by using the target information contained in the surrounding situation information 210.

The vehicle status information 230 indicates the status of the vehicle 1. The status of the vehicle 1 includes the speed (vehicle speed), acceleration, steering angle, yaw rate, and the like, of the vehicle 1. The status of the vehicle 1 also includes a driving operation made by the driver of the vehicle 1. The driving operation includes accelerator operation, brake operation, and steering operation. The controller 170 acquires the vehicle status information 230 from the vehicle status sensor 130.

The delivered information 240 is information that is obtained through the communication device 140. The controller 170 acquires the delivered information 240 by communicating with an external device through the communication device 140. For example, the delivered information 240 contains road traffic information (construction information, accident information, traffic control information, traffic congestion information, or the like) that is delivered from an infrastructure. The delivered information 240 may contain surrounding vehicle information that is obtained through V2V communication.

As shown in FIG. 8, the surrounding situation sensor 110, the vehicle position sensor 120, the vehicle status sensor 130, the communication device 140, and the controller 170 make up the information acquisition unit 20 that acquires the driving environment information 200.

2-3. Acquisition of Map Information

The controller 170 acquires required map information MAP from the map database MAP_DB. The map information MAP contains the trajectory map information TR_MAP that indicates the target trajectory TR_A of the vehicle 1 in autonomous driving. When the map database MAP_DB is installed in the vehicle 1, the controller 170 acquires required map information MAP from the map database MAP_DB. On the other hand, when the map database MAP_DB is outside the vehicle 1, the controller 170 acquires required map information MAP through the communication device 140. The map information MAP is stored in the storage device 172, read, and used as needed.

2-4. Vehicle Travel Control

The controller 170 executes vehicle travel control for controlling travel of the vehicle 1. The vehicle travel control contains steering control, acceleration control, and deceleration control. The controller 170 executes steering control, acceleration control, and deceleration control by actuating the traveling device 160 (the steering device, the drive device, and the braking device) as needed. The controller 170 and the traveling device 160 may be regarded as components of a vehicle travel control system that executes vehicle travel control.

The vehicle travel control contains autonomous driving control. Specifically, the controller 170 generates a travel plan based on the map information MAP and the driving environment information 200. The travel plan contains a target route to a destination, and a target trajectory TR_A. The controller 170 executes autonomous driving control such that the vehicle 1 travels in accordance with the travel plan. When an integrated target trajectory TR is provided from the trajectory adjusting device 40, the controller 170 replaces the target trajectory TR_A with the integrated target trajectory TR. The controller 170 executes autonomous driving control such that the vehicle 1 follows the integrated target trajectory TR.

2-5. Acquisition of Weight Information

The controller 170 acquires weight information WE. Specifically, the controller 170 prompts the user to designate weights through the HMI unit 150. The user designates weights by using the HMI unit 150. The controller 170 acquires the weight information WE that indicates the weights designated by the user. The weight information WE is stored in the storage device 172, read, and used as needed.

As shown in FIG. 8, the HMI unit 150 and the controller 170 make up the weight acquisition device 50 that acquires weight information WE.

3. Specific Example of Database Management Device

The database management device 30 manages the manual driving database MD_DB. Specifically, the database management device 30 acquires driving environment information 200 in manual driving of the vehicle 1. The driving environment information 200 contains the vehicle positional information 220 that indicates the position of the vehicle 1. The database management device 30 calculates a manual driving trajectory TR_M based on the vehicle positional information 220. The database management device 30 adds the manual driving trajectory information MD_MAP that indicates the manual driving trajectory TR_M into the manual driving database MD_DB (see FIG. 2).

The database management device 30 manages the map database MAP_DB. Management of the map database MAP_DB includes at least one of entry and update of trajectory map information TR_MAP that indicates a target trajectory TR_A.

Specifically, the database management device 30 sets a target trajectory TR_A in accordance with a certain rule based on the driving environment information 200. For example, the database management device 30 recognizes white lines LM that define a lane based on the surrounding situation information 210. The database management device 30 calculates a lane center position from the positions of the white lines LM, and sets the lane center position as the target trajectory TR_A. When the database management device 30 cannot calculate a lane center position, the database management device 30 recognizes a curb based on the surrounding situation information 210. The database management device 30 sets a position at a set distance from the curb as the target trajectory TR_A.

The database management device 30 adds trajectory map information TR_MAP into the map database MAP_DB. The trajectory map information TR_MAP indicates the target trajectory TR_A set in accordance with the set rule. Each time the vehicle 1 passes on the same road, the latest driving environment information 200 is obtained, and the latest trajectory map information TR_MAP is generated. The database management device 30 updates the trajectory map information TR_MAP contained in the map database MAP_DB by using the latest trajectory map information TR_MAP as needed.

In this way, the database management device 30 manages the manual driving database MD_DB and the map database MAP_DB based on the driving environment information 200. Therefore, the database management device 30 is configured to be able to acquire the driving environment information 200. The database management device 30 is also configured to be able to access the manual driving database MD_DB and the map database MAP_DB. The following configurations are conceivable as examples of the configuration of the database management device 30.

3-1. First Configuration Example

Figure 10:
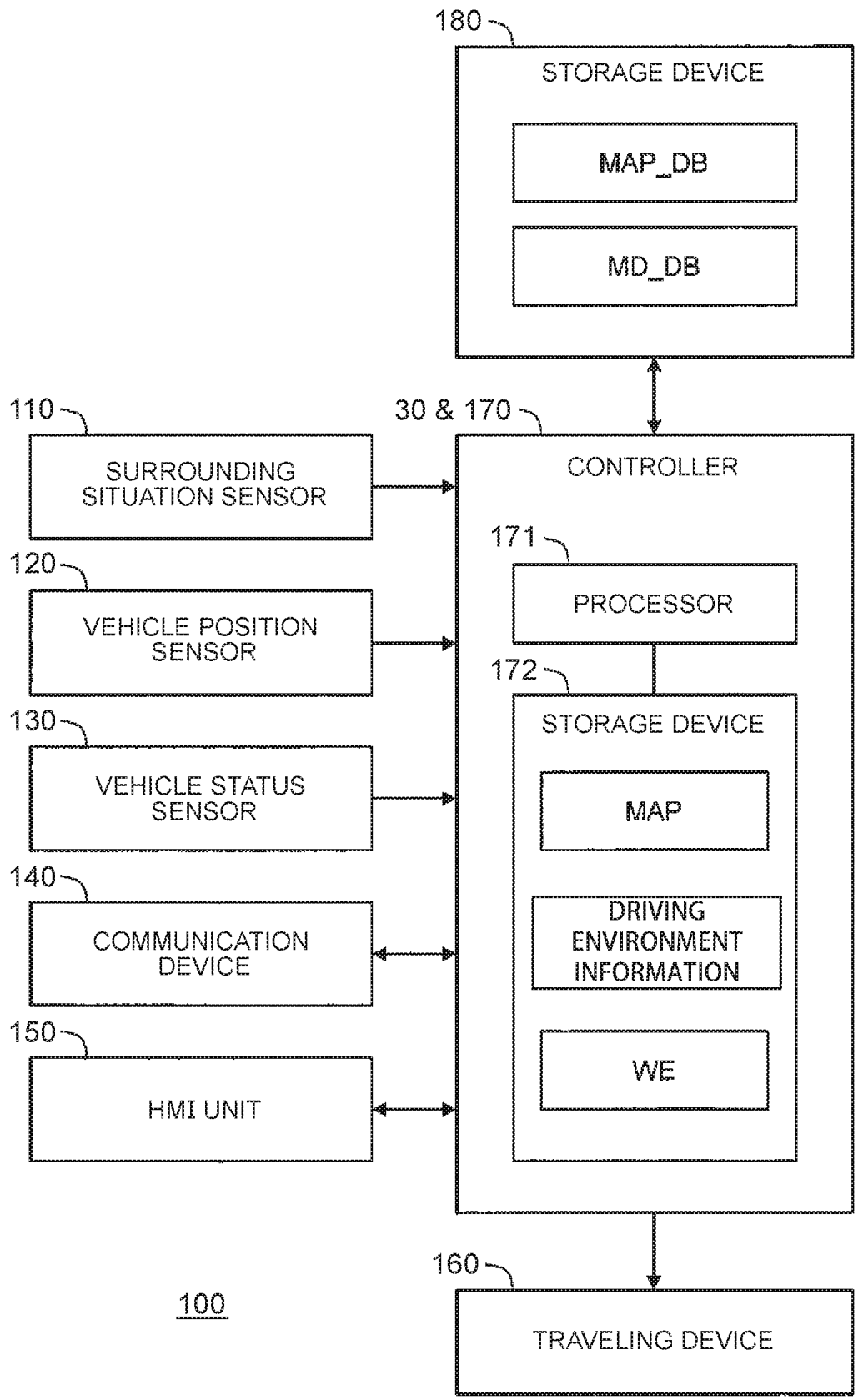
FIG. 10 is a block diagram that shows a first example of the configuration of a database management device according to the embodiment of the disclosure.

FIG. 10 is a block diagram that shows a first configuration example of the database management device 30. In the first configuration example, the controller 170 (processor 171) of the vehicle control apparatus 100 functions as the database management device 30. The manual driving database MD_DB and the map database MAP_DB are stored in a storage device 180 of the vehicle control apparatus 100. The storage device 180 may be one and the same as the storage device 172 of the controller 170. The controller 170 reads the driving environment information 200 from the storage device 172. The controller 170 manages the manual driving database MD_DB and the map database MAP_DB, stored in the storage device 180, based on the driving environment information 200.

3-2. Second Configuration Example

Figure 11:
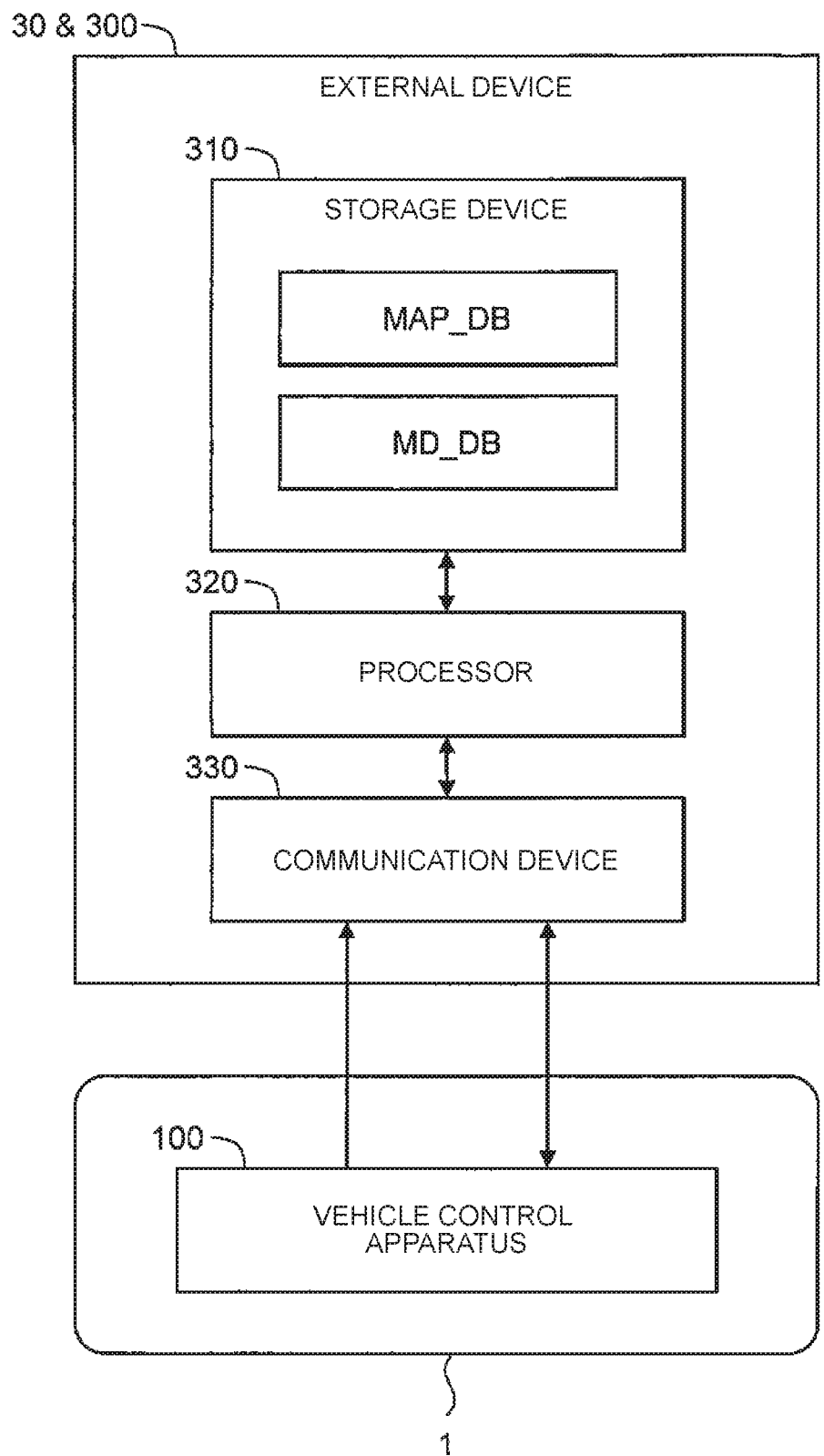
FIG. 11 is a block diagram that shows a second example of the configuration of the database management device according to the embodiment of the disclosure.

FIG. 11 is a block diagram that shows a second configuration example of the database management device 30. In the second configuration example, the database management device 30 is implemented by an external device 300 outside the vehicle 1. The external device 300 is, for example, a management server.

More specifically, the external device 300 includes a storage device 310, a processor 320, and a communication device 330. The manual driving database MD_DB and the map database MAP_DB are stored in the storage device 310. The communication device 330 communicates with the communication device 140 of the vehicle 1. The processor 320 executes various information processing by running computer programs stored in the storage device 310.

The vehicle control apparatus 100 (controller 170) transmits the driving environment information 200 to the external device 300 through the communication device 140. The processor 320 of the external device 300 receives the driving environment information 200 through the communication device 330. The processor 320 manages the manual driving database MD_DB and the map database MAP_DB, stored in the storage device 310, based on the driving environment information 200.

In the case of the second configuration example, the vehicle control apparatus 100 (controller 170) acquires required map information MAP from the external device 300. Specifically, the vehicle control apparatus 100 makes a request of the external device 300 to provide required map information MAP through the communication device 140. In response to the request, the processor 320 of the external device 300 reads required map information MAP from the storage device 310. The processor 320 transmits the map information MAP to the vehicle 1 through the communication device 330. The vehicle control apparatus 100 receives the map information MAP through the communication device 140.

3-3. Third Configuration Example

Figure 12:
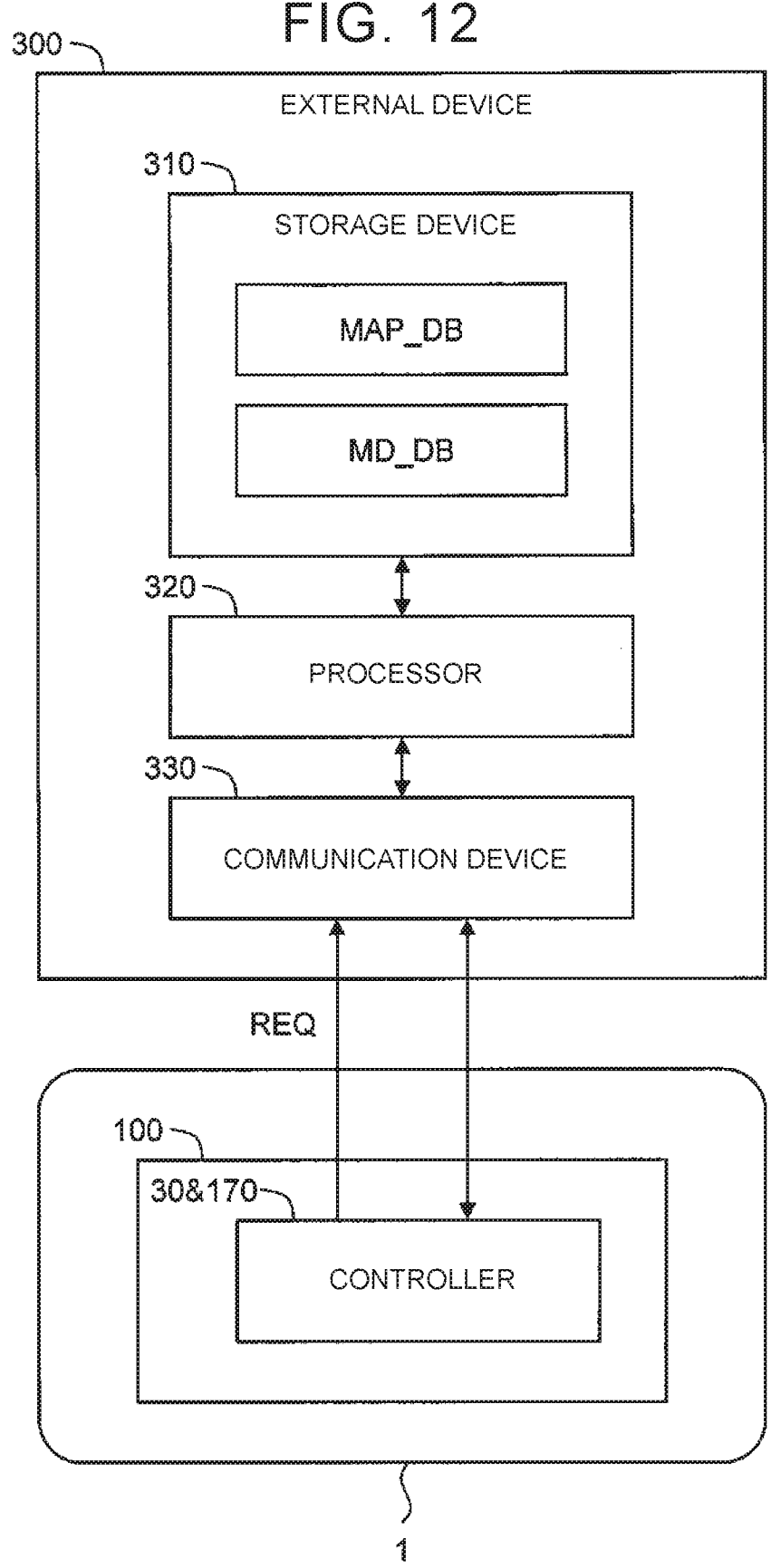
FIG. 12 is a block diagram that shows a third example of the configuration of the database management device according to the embodiment of the disclosure.

FIG. 12 is a block diagram that shows a third configuration example of the database management device 30. In the third configuration example, as in the case of the second configuration example, the manual driving database MD_DB and the map database MAP_DB are stored in the storage device 310 of the external device 300. On the other hand, the database management device 30 is implemented by the controller 170 of the vehicle control apparatus 100. That is, the controller 170 (processor 171) remotely manages the manual driving database MD_DB and the map database MAP_DB.

Specifically, the controller 170 generates information that needs to be added to the databases based on the driving environment information 200. The controller 170 transmits a request signal REQ to make a request to enter information to the external device 300 through the communication device 140. The processor 320 of the external device 300 receives the request signal REQ through the communication device 330. The processor 320 enters information to the databases in accordance with the request signal REQ.

3-4. Fourth Configuration Example

The functions of the database management device 30 may be distributed to the controller 170 (processor 171) of the vehicle 1 and the processor 320 of the external device 300. The manual driving database MD_DB and the map database MAP_DB may be stored in the storage device 180 of the vehicle 1 and the storage device 310 of the external device 300 in a distributed manner.

The first to fourth configuration examples may be summarized as follows. That is, a single processor (the processor 171 or the processor 320) or multiple processors (the processor 171 and the processor 320) execute a process as the database management device 30. The manual driving database MD_DB and the map database MAP_DB are stored in a single storage device (the storage device 180 or the storage device 310) or multiple storage devices (the storage device 180 and the storage device 310).

4. Specific Example of Trajectory Adjusting Device

The trajectory adjusting device 40 acquires information that indicates a target trajectory TR_A that is set by the vehicle control apparatus 100. The trajectory adjusting device 40 acquires the manual driving trajectory information MD_MAP on the target travel range from the manual driving database MD_DB. In addition, the trajectory adjusting device 40 acquires the weight information WE from the weight acquisition device 50. The trajectory adjusting device 40 executes a trajectory adjusting process based on the acquired information. Specifically, the trajectory adjusting device 40 determines an integrated target trajectory TR by integrating the target trajectory TR_A and the manual driving trajectory TR_M based on the weights designated in the weight information WE. The trajectory adjusting device 40 provides the determined integrated target trajectory TR to the vehicle control apparatus 100.

In this way, the trajectory adjusting device 40 is configured to be able to acquire required information from the vehicle control apparatus 100, the manual driving database MD_DB, and the weight acquisition device 50. The following configurations are conceivable as examples of the configuration of the trajectory adjusting device 40.

4-1. First Configuration Example

Figure 13:
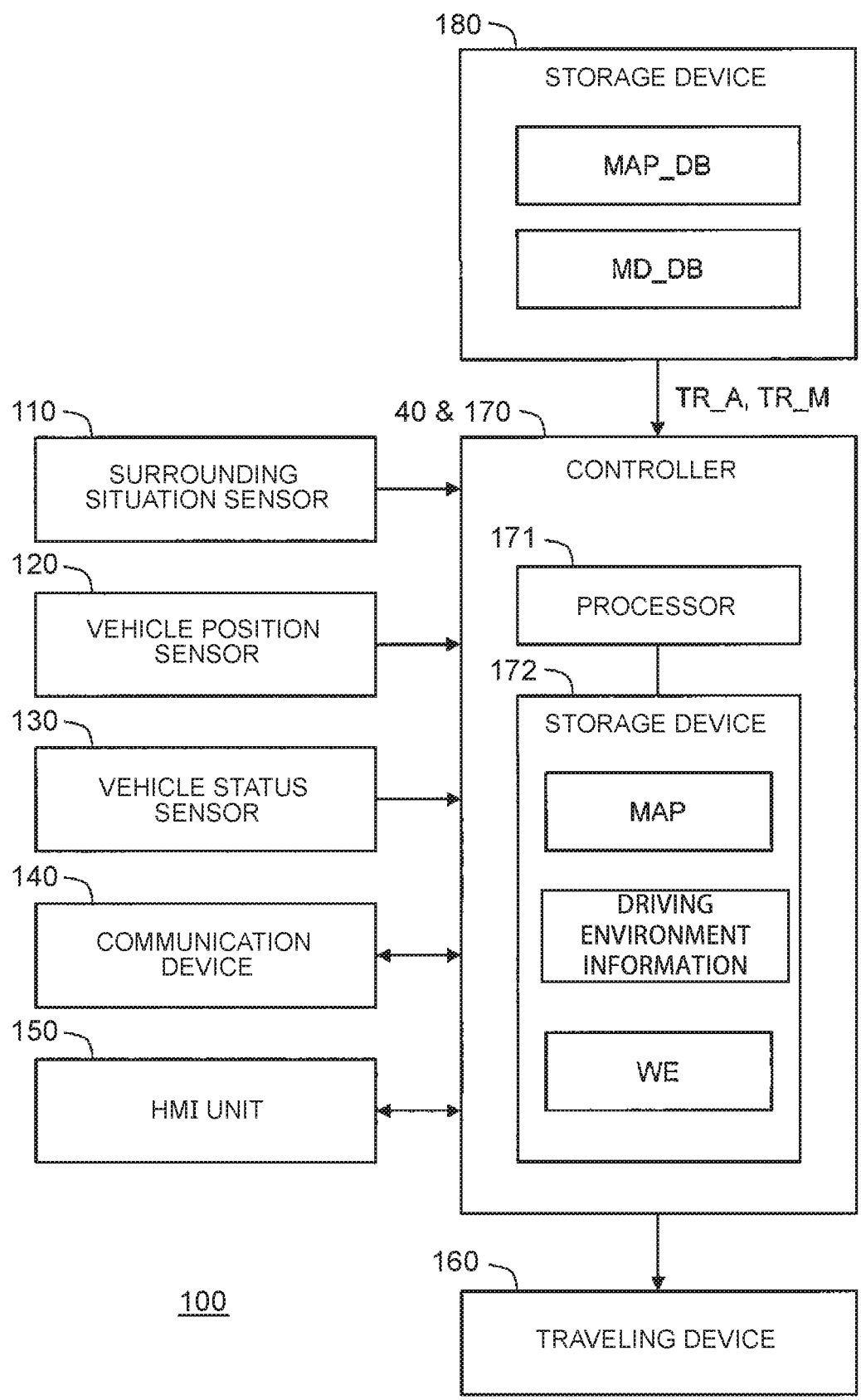
FIG. 13 is a block diagram that shows a first example of the configuration of the trajectory adjusting device according to the embodiment of the disclosure.

FIG. 13 is a block diagram that shows a first configuration example of the trajectory adjusting device 40. In the first configuration example, the manual driving database MD_DB and the map database MAP_DB are stored in the storage device 180 of the vehicle control apparatus 100. The storage device 180 may be one and the same as the storage device 172 of the controller 170.

First, setting of a target trajectory TR_A by the vehicle control apparatus 100 will be described. The vehicle control apparatus 100 sets a target trajectory TR_A by reading trajectory map information TR_MAP on a target travel range from the storage device 180 (map database MAP_DB). Alternatively, the vehicle control apparatus 100 may set a target trajectory TR_A based on the driving environment information 200 while the vehicle 1 is traveling in a target travel range. Map information MAP containing the target trajectory TR_A is stored in the storage device 172.

In the first example, the controller 170 (processor 171) of the vehicle control apparatus 100 functions as the trajectory adjusting device 40. Specifically, the controller 170 acquires the map information MAP containing the target trajectory TR_A from the storage device 172. The controller 170 acquires the manual driving trajectory information MD_MAP on the target travel range from the storage device 180 (manual driving database MD_DB). The controller 170 also acquires the weight information WE from the storage device 172. The controller 170 determines an integrated target trajectory TR by executing a trajectory adjusting process based on the acquired information.

4-2. Second Configuration Example

Figure 14:
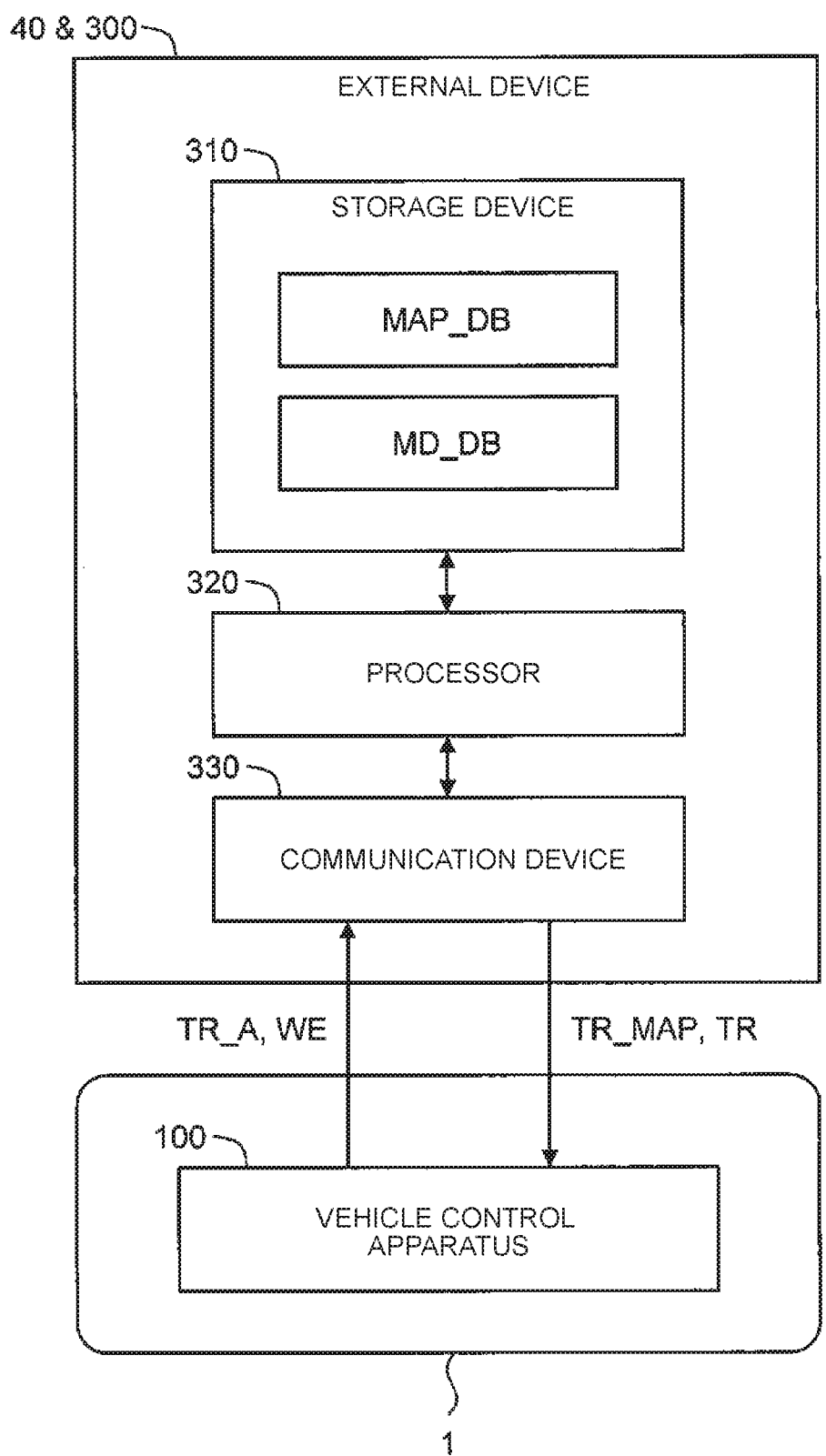
FIG. 14 is a block diagram that shows a second example of the configuration of the trajectory adjusting device according to the embodiment of the disclosure.

FIG. 14 is a block diagram that shows a second configuration example of the trajectory adjusting device 40. In the second configuration example, the trajectory adjusting device 40 is implemented by the external device 300 outside the vehicle 1. The configuration of the external device 300 is the same as the configuration shown in FIG. 11.

First, setting of a target trajectory TR_A by the vehicle control apparatus 100 will be described. The vehicle control apparatus 100 acquires trajectory map information TR_MAP from the external device 300. Specifically, the vehicle control apparatus 100 makes a request of the external device 300 to provide trajectory map information TR_MAP on a target travel range through the communication device 140. In response to the request, the processor 320 of the external device 300 reads trajectory map information TR_MAP from the storage device 310 (map database MAP_DB). The processor 320 transmits the trajectory map information TR_MAP to the vehicle 1 through the communication device 330. The vehicle control apparatus 100 receives the trajectory map information TR_MAP through the communication device 140, and thus sets a target trajectory TR_A. Alternatively, the vehicle control apparatus 100 may set a target trajectory TR_A based on the driving environment information 200 while the vehicle 1 is traveling in the target travel range.

The vehicle control apparatus 100 transmits the information of the target trajectory TR_A to the external device 300 through the communication device 140. The controller 170 transmits the weight information WE acquired by the weight acquisition device 50 to the external device 300 through the communication device 140.

The processor 320 of the external device 300 receives the information of the target trajectory TR_A and the weight information WE through the communication device 330. The processor 320 acquires manual driving trajectory information MD_MAP on the target travel range from the storage device 310 (manual driving database MD_DB). The processor 320 determines an integrated target trajectory TR by executing a trajectory adjusting process based on the acquired information. The processor 320 provides the integrated target trajectory TR to the vehicle control apparatus 100 through the communication device 330.

4-3. Third Configuration Example

FIG. 15 is a block diagram that shows a third configuration example of the trajectory adjusting device 40. In the third configuration example, as in the case of the second configuration example, the manual driving database MD_DB and the map database MAP_DB are stored in the storage device 310 of the external device 300. On the other hand, the trajectory adjusting device 40 is implemented by the controller 170 of the vehicle 1.

Setting of a target trajectory TR_A by the vehicle control apparatus 100 is similar to that in the case of the second configuration example. Map information MAP containing the target trajectory TR_A is stored in the storage device 172.

The controller 170 makes a request of the external device 300 to provide manual driving trajectory information MD_MAP on the target travel range through the communication device 140. In response to the request, the processor 320 of the external device 300 reads manual driving trajectory information MD_MAP from the storage device 310 (manual driving database MD_DB). The processor 320 transmits the manual driving trajectory information MD_MAP to the vehicle 1 through the communication device 330. The controller 170 receives the manual driving trajectory information MD_MAP through the communication device 140.

The controller 170 acquires map information MAP containing a target trajectory TR_A from the storage device 172. The controller 170 also acquires weight information WE from the storage device 172. The controller 170 determines an integrated target trajectory TR by executing a trajectory adjusting process based on the acquired information.

4-4. Fourth Configuration Example

The functions of the trajectory adjusting device 40 may be distributed to the controller 170 (processor 171) of the vehicle 1 and the processor 320 of the external device 300. The manual driving database MD_DB and the map database MAP_DB may be stored in the storage device 180 of the vehicle 1 and the storage device 310 of the external device 300 in a distributed manner.

The first to fourth configuration examples may be summarized as follows. That is, a single processor (the processor 171 or the processor 320) or multiple processors (the processor 171 and the processor 320) execute a process as the trajectory adjusting device 40. The manual driving database MD_DB and the map database MAP_DB are stored in a single storage device (the storage device 180 or the storage device 310) or multiple storage devices (the storage device 180 and the storage device 310).

What is claimed is:

1. A vehicle control system comprising:
   a manual driving database configured to contain manual driving trajectory information that indicates a manual driving trajectory that is a trajectory of a vehicle in manual driving;
   at least one processor configured to:
   set a target trajectory of the vehicle performing autonomous driving;
   prompt a user to select a weight of the manual driving trajectory and a weight of the target trajectory;
   acquire a user selection of the weight of the target trajectory and a user selection of the weight of the manual driving trajectory; and
   determine an integrated target trajectory by integrating the target trajectory and the manual driving trajectory based on the selected weight of the target trajectory and the selected weight of the manual driving trajectory; and
   control the autonomous driving of the vehicle such that the vehicle follows the integrated target trajectory.

2. The vehicle control system according claim 1, wherein the at least one processor is configured to, when there is a plurality of manual driving trajectories in a target travel range, acquire a representative manual driving trajectory by integrating the manual driving trajectories, and determine the integrated target trajectory by integrating the target trajectory and the representative manual driving trajectory based on the weights.

3. The vehicle control system according to claim 1, wherein: the vehicle control system comprises a human machine interface unit; and the weights are selected by the user through the human machine interface unit.

4. The vehicle control system according to claim 3, wherein: the human machine interface unit comprises a touch panel, and
wherein the at least one processor is further configured to control the human machine interface unit to display a weight selection screen that contains a plurality of buttons for selecting different weights.

5. The vehicle control system according to claim 3, wherein the human machine interface unit is configured to visually display the target trajectory and the manual driving trajectory.

6. The vehicle control system according to claim 3, wherein the human machine interface unit is configured to, based on an image in front of the vehicle being available, display the target trajectory and the manual driving trajectory over the in front image.

7. The vehicle control system according to claim 1, further comprising a map database configured to contain trajectory map information that indicates the target trajectory, wherein the at least one processor is further configured to set the target trajectory by reading the trajectory map information from the map database.

8. A vehicle control system that controls a vehicle, comprising:
a single or multiple processors; and
a storage device in which manual driving trajectory information that indicates a manual driving trajectory that is a trajectory of the vehicle in manual driving is stored, wherein the single or multiple processors are configured to:

set a target trajectory of the vehicle performing autonomous driving;
prompt a user to select a weight of the manual driving trajectory and a weight of the target trajectory;
acquire a user selection the weight of the target trajectory and a user selection of the weight of the manual driving trajectory,
determine an integrated target trajectory by integrating the target trajectory and the manual driving trajectory based on the selected weight of the target trajectory and the selected weight of the manual driving trajectory, and
control the autonomous driving of the vehicle such that the vehicle follows the integrated target trajectory.

9. A vehicle control method comprising:
setting a target trajectory of a vehicle performing autonomous driving;
storing manual driving trajectory information that indicates a manual driving trajectory that is a trajectory of the vehicle in manual driving;
prompting a user to select a weight of the manual driving trajectory and a weight of the target trajectory;
acquiring a user selection of the weight of the target trajectory and a user selection of the weight of the manual driving trajectory;
determining an integrated target trajectory by integrating the target trajectory and the manual driving trajectory based on the selected weight of the target trajectory and the selected weight of the manual driving trajectory; and
controlling the autonomous driving of the vehicle such that the vehicle follows the integrated target trajectory.

* * * * *